Aug. 18, 1970 G. C. WAYBRIGHT 3,524,925

PROTECTION CIRCUITRY

Filed July 23, 1968 2 Sheets-Sheet 1

INVENTOR.
GEORGE CLEVELAND WAYBRIGHT

BY

Cyril A. Krenzer
ATTORNEY

INVENTOR.
GEORGE CLEVELAND WAYBRIGHT
BY
Gie A. Kunze
ATTORNEY

United States Patent Office 3,524,925
Patented Aug. 18, 1970

3,524,925
PROTECTION CIRCUITRY

George Cleveland Waybright, Batavia, N.Y., assignor to Sylvania Electric Products Inc., a corporation of Delaware Filed July 23, 1968, Ser. No. 746,988
Int. Cl. H04n 5/44, 7/00
U.S. Cl. 178—5.4 14 Claims

ABSTRACT OF THE DISCLOSURE

In a reproduction system having electrical to optical and optical to electrical signal transducer means providing a visual display of signals derived from television signals and photographic film, a protection circuit for the optical to electrical signal transducer includes series connected first and second switching means for selectively coupling and decoupling a deflection signal source and a potential reference level and a detachment means and switching means series connected for selective coupling and decoupling of a power supply and an electrode of a flying spot scanner tube of the optical to electrical signal transducer and a deflection signal source and deflection apparatus associated with the flying spot scanner tube.

BACKGROUND OF THE INVENTION

The long felt need for a consumer product capable of providing a visual display in response to both television signals and photographic films has been fulfilled by the reproduction system set forth in co-pending application Ser. No. 657,623, entitled "Color Reproduction System" filed Aug. 1, 1967, and assigned to the assignee of the present application. Therein, the reproduction system includes an electrical to optical signal transducer, an optical to electrical signal transducer, and a functional switch for selecting the signals applied to an image reproducer.

More specifically, one embodiment of the above reproduction system includes a color television receiver, a flying spot scanner system, and a functional switching means for selectively applying signals derived from television signals and photographic film to an image reproducer. Also, the color television receiver and the flying spot scanner system employ components in common to effect reduced costs and circuit simplification.

In the employment of components in common, the deflection apparatus associated with the color picture tube of the television receiver and the deflection apparatus associated with the flying spot scanner tube of the flying spot scanner system are both coupled to a common source of deflection signals. Thus, interruption of signals from the deflection signal source would normally affect scansion of both the color picture tube and the flying spot scanner tube.

However, the electron beam current of the flying spot scanner tube is of an intensity such that any loss of electron beam deflection in either one of the two perpendicular directions of scan deflection causes screen burning and degradation of the flying spot scanner tube. Moreover, normal operation of the color television receiver requires interruption in the deflection of the electron beam in at least one of the two perpendicular directions in order to provide the correct "set-up" or pre-conditioning adjustments to the receiver. Thus, protection circuitry for the flying spot scanner system is required.

Further, it would be desirable to de-energize the flying spot scanner system except during periods of use in order to conserve the usefulness of the apparatus. Moreover, it is desirable that a protective system should be provided to prevent degradation of the flying spot scanner tube should inadvertent interruption of deflection signals occur.

OBJECTS AND SUMMARY OF THE INVENTION

Therefore, it is an object of the present invention to provide protection circuitry for a reproduction system which includes electrical to optical and optical to electrical signal transducers. Another object of the invention is to provide protection circuitry for a flying spot scanner system. Still another object of the invention is to provide protection circuitry for a flying spot scanner system upon interruption of signals from a deflection signal source. A further object of the invention is to provide protection circuitry for a flying spot scanner system and discontinuance of the electron beam of a flying spot scanner tube upon inadvertent interruption of signals from a deflection signal source.

These and other objects and advantages are achieved in one aspect of the invention by first and second switching means series connected intermediate a deflection signal source and deflection signal apparatus associated with a flying spot scanner system. Also, a series connected detachment means and switching means selectively connect a power source to an electrode of a flying spot scanner tube while the detachment means couples the deflection signal source and deflection apparatus of the flying spot scanner tube.

DESCRIPTION OF THE PREFERRED EMBODIMENT

For a better understanding of the present invention, together with other and further objects, advantages and capabilities thereof, reference is made to the following disclosure and appended claims in connection with the accompanying drawings.

Figure 1:
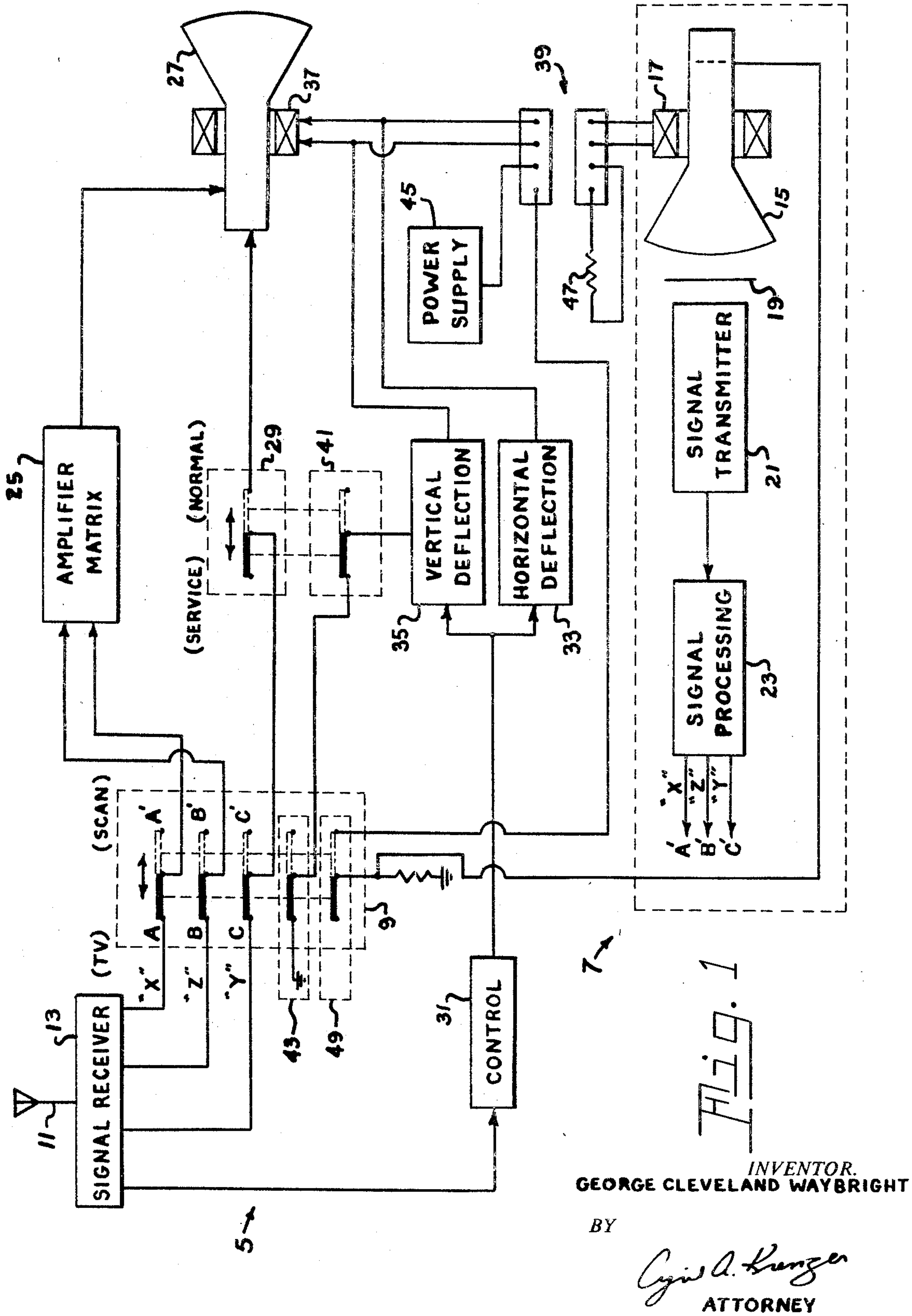
FIG. 1 illustrates a color reproduction system for photographic film or television signals and includes protection circuitry for a flying spot scanner system.

Referring to the drawings, FIG. 1 illustrates a color reproduction system which includes an electrical to optical signal transducer in the form of a color television receiver 5, an optical to electrical signal transducer in the form of a flying spot scanner system 7, and a functional switching means 9 having positional locations designated "TV" and "Scan." The reproduction system provides a visual display of electrical signals derived from television signals or photographic film.

The television receiver 5 includes the usual antenna 11 for intercepting and applying transmitted television signals to a signal receiver 13. In the signal receiver 13, the intercepted signals are converted to chrominance and luminance signals, "*x, z,* and *y*" signals, representative of color and brightness and these converted signals "*x, z,* and *y*" signals, are applied to terminals A, B, and C respectively of the functional switching means 9.

Also, the flying spot scanner system 7 includes a flying spot scanner tube 15 having associated deflection apparatus 17, a photographic film 19, a signal transmitter 21, and signal processing apparatus 23. Therein, light scansion of the film 19 by the scanner tube 15 provides chrominance and luminance signals, "*x, z,* and *y*" representative of color and brightness which are applied to terminals A', B', and C' respectively of the functional switching means 9.

The functional switching means 9 is selectively positioned to transmit the chrominance and luminance, "*x,* z, and y" signals from either the signal receiver 13 of theh television receiver 5 or the signal processing apparatus 23 of the flying spot scanner system 7.

Upon transmission of the signals by the functional switching means 9, the chrominance signals, x and z signals, are applied to an amplifier and matrix means 25 wherein color difference signals are derived and applied to a color picture tube 27 of the television receiver 5. In turn, the luminance signals, "y" signals, are applied via a "service" switching means 29 to the color picture tube 27.

Also, the signal receiver 13 of the television receiver 5 derives control signals which are applied to a control signal stage 31 wherein synchronized signals are derived and applied to a horizontal deflection stage 33 and a vertical deflection stage 35. The horizontal and vertical deflection stages, 33 and 35 respectively, provide deflection signals which are applied to deflection apparatus 37 associated with the picture tube 27 of the television receiver 5 and via a detachment means 39 to the deflection apparatus 17 associated with the flying spot scanner tube 15 of the flying spot scanner system 7.

Further, the vertical deflection stage 35 is selectively coupled, in this case, by way of a first switching means 41 "ganged" to the switching means 29 and a series connected second switching means 43 selectively coupled to a potential reference level and "ganged" to the functional switching means 9. Also, the detachment means 39 serves to connect the horizontal and vertical deflection stages, 33 and 35, to the deflection apparatus 17 of the flying spot scanner tube 15 and electrically connects a power source 45 via a resistor 47 and a third switching means 49 to an electrode of the flying spot scanner tube 15 of the flying spot scanner system 7. Thus, the power supply 45 is series connected via the detachment means 39 and third switching means, "ganged" to the functional switching means 9, to an electrode of the flying spot scanner tube 15.

Figures 2, 3:
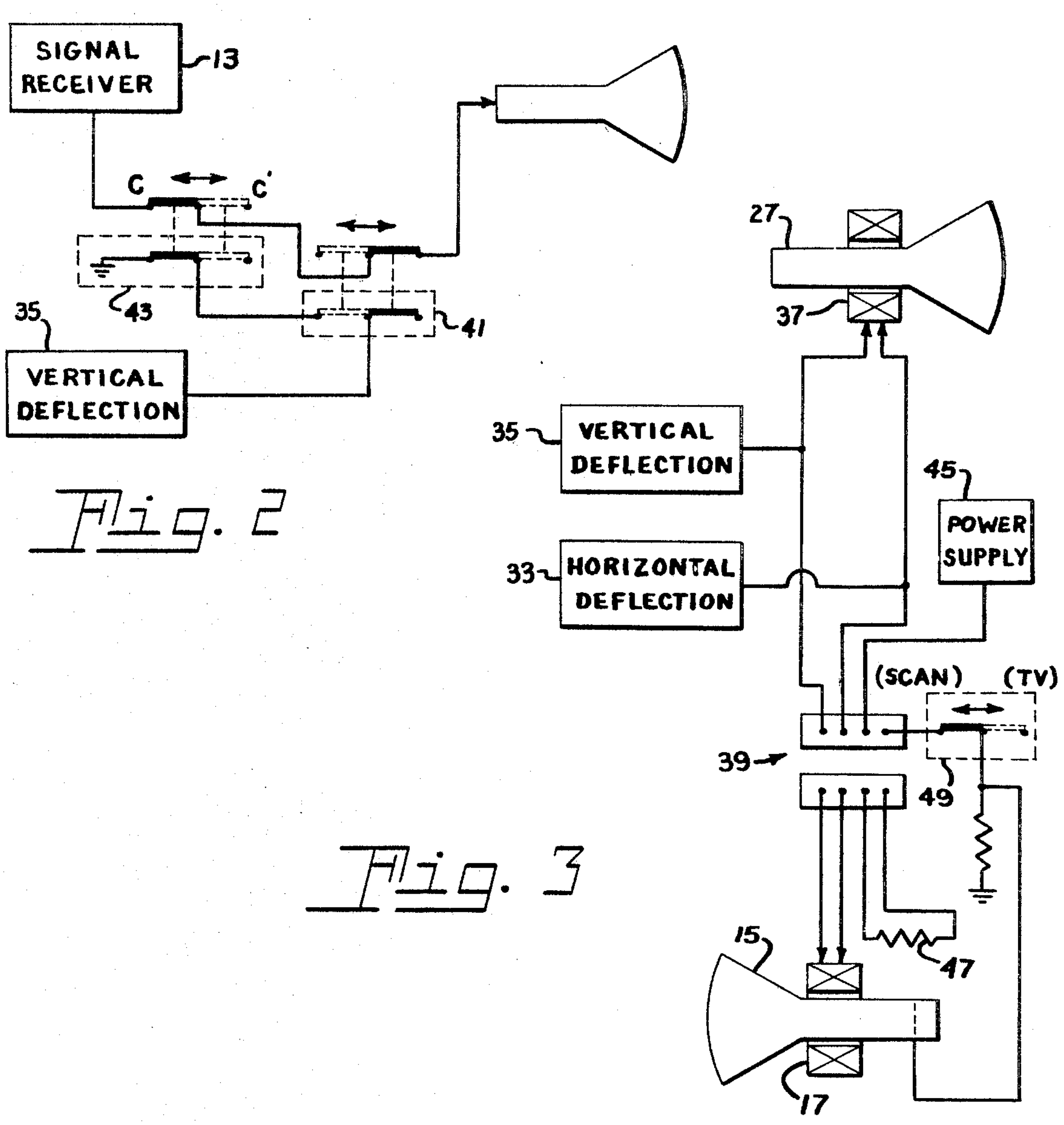
FIG. 2 is a simplified diagrammatic illustration of one aspect of the protection circuitry of FIG. 1.
FIG. 3 is a simplified diagrammatic illustration of another aspect of the protection circuit of FIG. 1.

Referring to the simplified diagram of FIG. 2, the vertical deflection stage 35 is selectively coupled and decoupled to a potential reference level such as circuit ground via the series connected first and second switching means 41 and 43 respectively. Also, the simplified diagram of FIG. 3 more clearly illustrates the horizontal and vertical deflection stages, 33 and 35, coupled to the deflection apparatus 37 associated with the cathode ray tube 27 and via the detachment means 39 to the deflection apparatus 17 associated with the flying spot scanner tube 15. The power supply 45 is series connected via the detachment means 39 which is preferably in the form of a cooperating socket and base arrangement having the resistor 47 wired therein, the resistor 47, and a third switching means 49 to an electrode of the flying spot scanner tube 15.

As to the operation, it is a common practice in the television receiver art to provide a switch 29 for interrupting the application of luminance signals to the picture tube 27 in order to achieve proper "set-up" or pre-conditioning of the picture tube 27. Also, it is a common practice to provide a means for interrupting deflection of the electron beam of the picture tube 27 in one of two perpendicular directions to facilitate the "set-up" or pre-conditioning. Moreover, deflection of the electron beam is normally interrupted by a switch means "ganged" to the switch 29 and selectively coupled to a potential reference level and as circuit ground.

However, it has been previously mentioned that any interruption in the deflection of the electron beam of the flying spot scanner tube is deleterious to the operation of the tube. Also, it is necessary to protect the flying spot scanner tube from interruption of the electron beam scansion should the reproduction system be shifted to the photographic film scan position with the switch 29 inadvertently remaining positioned in the "service" location whereby the deflection signal source is normally interrupted.

Therefore, it can readily be seen that positioning the switch 29 on "service" and the functional switch 9 on "TV" causes series coupling of the first and second switching means, 41 and 43 respectively, intermediate the deflection signal source 35 and circuit ground. Thus, the deflection of the electron beams of the picture tube 27 in one of two perpendicular directions is interrupted and "set-up" or pre-conditioning can be effected. Moreover, the third switching means 49 "ganged" to the functional switching means 9 serves to decouple the power supply 45 from the electrodes of the flying spot scanner tube 15 when the functional switching means 9 is in the "TV" position.

Accordingly, the flying spot scanner tube 15 is de-energized when the functional switching means 9 is in the "TV" location. Also, the deflection signal source 35 is coupled to circuit ground when the switching means 29 is at "service" and the functional switching means 9 is at "TV." Moreover, even if the switching means 29 is inadvertently left at the "service" location when the functional switching means 9 is shifted to "scan," the flying spot scanner tube 15 is protected since the deflection signal source 35 is no longer coupled to circuit ground by the second switching means 43.

Further, the flying spot scanner tube 15 is energized by the power supply 45 via the series connected detachment means 39, resistor 47, and third switching means 49 "ganged" to the functional switching means 9. Also, the deflection apparatus 17 associated with the flying spot scanner tube 15 is coupled to the deflection signal source 35 via the detachment means 39.

Thus, the third switching means 49 serves to de-energize the flying spot scanner tube 15 whenever the functional switching means 9 is located in the "TV" position whereupon the life expectency of the flying spot scanner tube 15 is extended. Also, inadvertent decoupling of the deflection apparatus 17 from the deflection signal source 35 by the detachment means 39 is accompanied by decoupling of the power supply 45 from the electrode of the flying spot scanner tube 15. Thus, the flying spot scanner tube 15 is de-energized whenever the deflection apparatus 17 is de-energized.

Thus, a unique protection system for the optical to electrical signal transducer of a combined optical to electrical and electrical to optical signal transducer system has been provided. The flying spot scanner tube of the optical to electrical signal transducer system is protected from planned as well as inadvertent interruption in the supply of deflection signals. Moreover, the flying spot scanner system is purposefully de-energized during period of television receiver operation and "set-up" or preconditioning.

While there has been shown and described what is at present considered the preferred embodiment of the invention, it will be obvious to those skilled in the art that various changes and modifications may be made therein without departing from the invention as defined by the appended claims.

I claim:

1. In an image reproduction system including an electrical to optical signal transducer having an image reproducer with associated deflection apparatus, and a deflection signal source; an optical to electrical signal transducer having a cathode ray tube with associated deflection apparatus; and functional switching means for selectively coupling electrical signals derived from the electrical to optical and optical to electrical signal transducers, to the image reproducer, a protection circuit comprising in combination: a third switching means ganged to said functional switching means for selective coupling and decoupling of a power supply and said cathode ray tube of said optical to electrical signal transducer in accordance with the positional location of said functional switching means.

2. The combination of claim 1 including first and second switching means series connected intermediate said deflection signal source and a potential reference level whereby application of signals from said deflection signal source to said deflection signal apparatus is dependent upon selective positioning of both said first and second switching means.

3. The combination of claim 1 wherein said electrical to optical signal transducer includes a switching means for selectively coupling and decoupling luminance and reference signals to said image reproducer and said first switching means is "ganged" to said switching means.

4. The combination of claim 1 wherein said second switching means is "ganged" to said functional switching means.

5. The combination of claim 1 wherein said first switching means selectively couples and decouples said deflection signal source and said second switching means selectively couples and decouples said first switching means and a potential reference level.

6. The combination of claim 1 including a series connected third switching means and a detachment means selectively coupling and decoupling a power source and an electrode of said cathode ray tube.

7. The combination of claim 6 wherein said detachment means couples and decouples deflection apparatus associated with said cathode ray tube and a deflection signal source.

8. In an image reproduction system including a compatible color television receiver having a color picture tube with associated deflection apparatus and a source of deflection signals; a flying spot scanner system including a flying spot scanner tube having electrodes and associated deflection apparatus; and functional switching means for selectively coupling and decoupling electrical signals derived from photographic film and television signals to the color picture tube, a protection circuit comprising in combination: first and second series connected switching means selectively coupling and decoupling said source of deflection signals and a potential reference level and a third switching means for selectively coupling and decoupling a power source to an electrode of said flying spot scanner tube whereby application of signals from said deflection signal source to said deflection apparatus associated with said color picture tube is dependent upon the positional location of said first and said second switching means.

9. The combination of claim 8 wherein said second switching means is "ganged" to said functional switching means.

10. The combination of claim 8 including a third switching means for selectively coupling and decoupling a power source to an electrode of said flying spot scanner tube, said third switching means being "ganged" to said functional switching means.

11. The combination of claim 8 including a series connected detachment means and a third switching means selectively coupling and decoupling a power source and an electrode of said flying spot scanner tube.

12. The combination of claim 8 including a series connected detachment means, resistor, and a third switching means selectively coupling and decoupling a power source and an electrode of said flying spot scanner tube.

13. The combination of claim 11 wherein said detachment means selectively couples and decouples said deflection apparatus associated with said flying spot scanner tube and a deflection signal means.

14. The combination of claim 11 wherein said color television receiver includes a switching means, said first switching means is "ganged" to said switching means and said second and third switching means are "ganged" to said functional switching means.

References Cited

UNITED STATES PATENTS

| | | | |
|---|---|---|---|
| 3,008,001 | 11/1961 | Reith. | |
| 3,270,125 | 8/1966 | Kelly et al. | |
| 3,270,131 | 8/1966 | Dinter | 178—6.8 |
| 3,461,225 | 8/1969 | Crookshanks et al. | |
| 3,472,952 | 10/1969 | Alway | 178—6.8 |

ROBERT L. GRIFFIN, Primary Examiner

D. E. STOUT, Assistant Examiner

U.S. Cl. X.R.

178—6.8